United States Patent
Lin et al.

(10) Patent No.: US 7,679,346 B2
(45) Date of Patent: Mar. 16, 2010

(54) POWER SUPPLY APPARATUS AND OPERATION-MODE DETERMINING UNIT AND METHOD THEREOF

(75) Inventors: Chung-Wei Lin, Pingtung County (TW); Ruei-Ming Gan, Taipei County (TW); Yung-Pin Lee, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 636 days.

(21) Appl. No.: 11/553,470

(22) Filed: Oct. 27, 2006

(65) Prior Publication Data

US 2008/0022139 A1 Jan. 24, 2008

(30) Foreign Application Priority Data

Jul. 24, 2006 (TW) .............................. 95126912 A

(51) Int. Cl.
G05F 1/40 (2006.01)

(52) U.S. Cl. ..................................... 323/282

(58) Field of Classification Search ................. 323/282, 323/283, 284, 285, 351
See application file for complete search history.

(56) References Cited

U.S. PATENT DOCUMENTS

| | | | |
|---|---|---|---|
| 6,366,070 B1 * | 4/2002 | Cooke et al. ................. | 323/284 |
| 6,433,525 B2 | 8/2002 | Muratov et al. | |
| 6,456,050 B1 * | 9/2002 | Agiman ....................... | 323/282 |
| 6,580,258 B2 * | 6/2003 | Wilcox et al. ................ | 323/282 |
| 6,801,028 B2 * | 10/2004 | Kernahan et al. ........... | 323/283 |
| 2007/0247131 A1 * | 10/2007 | Sohma ........................ | 323/284 |

FOREIGN PATENT DOCUMENTS

| TW | 200508836 | 3/2005 |
|---|---|---|
| TW | 200627117 | 8/2006 |

OTHER PUBLICATIONS

"Office Action of Taiwan counterpart application", issued on Aug. 28, 2009, p. 1-p. 5.

* cited by examiner

*Primary Examiner*—Adolf Berhane
(74) *Attorney, Agent, or Firm*—Jianq Chyun IP Office

(57) ABSTRACT

A power supply apparatus and an operation-mode determining unit and a method thereof are provided. The power supply apparatus includes first and second control units, a switching unit, a power output unit, and an operation-mode determining unit. The first and second control units provide first and second control signals respectively. The switching unit selects to output the first or second control signal according to a switching signal. The power output unit adjusts its output power in accordance with the control signal output from the switching unit. The operation-mode determining unit compares an operation frequency in the power output unit with a reference frequency, and detects an inductor current in the power output unit. The operation-mode determining unit determines the state of a switching signal and outputs it to the switching unit in accordance with the comparison result and the detection result.

30 Claims, 4 Drawing Sheets

7,679,346 B2

POWER SUPPLY APPARATUS AND OPERATION-MODE DETERMINING UNIT AND METHOD THEREOF

CROSS-REFERENCE TO RELATED APPLICATION

This application claims the priority benefit of Taiwan application serial no. 95126912, filed on Jul. 24, 2006. All disclosure of the Taiwan application is incorporated herein by reference.

BACKGROUND OF THE INVENTION

1. Field of the Invention

The present invention relates to a power supply apparatus. More particularly, the present invention relates to an operation-mode determining unit of a power supply apparatus and an operation-mode determining method thereof.

2. Description of Related Art

Power management circuits play an important role in current electronic products, for example, a DC Buck converter is commonly-used and an important power management technique. In various designs of DC converters, it is an important subject to successfully switch to a pulse-width modulation (PWM) mode and a pulse-frequency modulation (PFM) mode according to the magnitude of load current. FIG. 1 illustrates the relationship between the conversion efficiency and the load current in the PWM mode and the PFM mode. Referring to FIG. 1, for a light load power supply (i.e., low output current), the power supply apparatus must be designed to adopt the PFM mode to regulate the voltage. On the contrary, for a heavy load power supply (i.e., high output current), the power supply apparatus must be designed to adopt the PWM mode to regulate the voltage.

In order to allow a power supply apparatus operate in application environments of both light load and heavy load, the power supply apparatus must have both the PWM mode and the PFM mode and automatically select one of them according to the load state. For example, U.S. Pat. No. 6,433,525 of Intersil Corporation uses a circuit of detecting a zero inductor current to detect whether or not the polarity of the inductor current has been changed, and adopts a counter to delay the switching time sequence of the operation mode.

FIG. 2A is a block diagram of U.S. Pat. No. 6,433,525. FIG. 2B is a schematic view of waveforms of signals of FIG. 2A. As known from FIGS. 2A and 2B, the conventional art uses a circuit for detecting the zero inductor current in a mode control 50 to detect whether or not the direction of the inductor current IIND has been changed. When the inductor current IIND changes the direction, a comparator in the mode control 50 outputs a control signal to the counter in the mode control 50. When the signal output from the comparator is positive and the count of the counter reaches the predetermined number of times, the mode control 50 outputs a logic signal to perform switching from the PWM mode to the PFM mode. On the contrary, when the signal output from the comparator is negative and the count of the counter reaches the predetermined number of times, the output logic signal is changed to perform switching from the PFM mode to the PWM mode.

In the above technology, the counter is required to count the time since the load state starts to change, i.e., the counter is used to provide a delay switching mechanism. However, in the conventional art, as the judgment time of a hysteretic counter is required to determine whether or not to switch the operation mode, the response time of the power supply apparatus is impacted significantly.

SUMMARY OF THE INVENTION

The present invention is to provide a power supply apparatus, which is capable of quickly switching the operation mode according to the load state.

The present invention is to provide an operation-mode determining unit, which saves the design of the hysteretic counter, thereby accelerating the switching between the operation modes.

The present invention is to provide a method of determining the operation mode of a power supply apparatus, which uses the characteristic that the operating frequency changes along with the changing of load current in the PFM mode to achieve the purpose of quickly switching the operation mode.

The present invention provides a power supply apparatus, which comprises a first control unit, a second control unit, a switching unit, a power output unit, and an operation-mode determining unit. The first control unit and the second control unit provide a first control signal and a second control signal respectively. The switching unit is coupled to the first control unit and the second control unit. The switching unit selectively outputs the first control signal or the second control signal according to a switching signal. The power output unit is coupled to the switching unit. The power output unit adjusts its output power in accordance with the control signal output from the switching unit. The operation-mode determining unit is coupled to the power output unit and the switching unit. The operation-mode determining unit detects an inductor current and an operation frequency in the power output unit for determining a state of the switching signal, and outputs the switching signal to the switching unit according to the detection result.

In the power supply apparatus according to the preferred embodiment of the present invention, the operation-mode determining unit comprises a frequency comparator, a zero current detector, and a mode controller. The frequency comparator is coupled to the power output unit to compare an operation frequency in the power output unit with a reference frequency. The zero current detector is coupled to the power output unit to detect the inductor current of the power output unit. The mode controller is coupled to the frequency comparator, the zero current detector, and the switching unit to determine a state of the switching signal and output it to the switching unit according to the comparison result of the frequency comparator and the detection result of the zero current detector.

The present invention also provides an operation-mode determining unit to switch an operation mode of a power supply apparatus. The operation-mode determining unit comprises a frequency comparator, a zero current detector, and a mode controller. The frequency comparator compares the operation frequency in the power supply apparatus with the reference frequency. The zero current detector detects the inductor current in the power supply apparatus. The mode controller is coupled to the frequency comparator and the zero current detector. The zero current detector determines the state of the switching signal and outputs it to the power supply apparatus according to the comparison result of the frequency comparator and the detection result of the zero current detector. The power supply apparatus determines the operation mode according to the switching signal.

The present invention also provides a method of determining the operation-mode of the power supply apparatus, which comprises the following steps. First, the operation frequency in the power supply apparatus is compared with the reference frequency, and the inductor current in the power supply apparatus is detected. When the power supply apparatus is in the first operation mode, whether or not to change the operation mode of the power supply apparatus is determined according to the comparison result. When the power supply apparatus is in the second operation mode, whether or not to change the operation mode of the power supply apparatus is determined according to the detection result.

By utilizing the characteristic that the frequency of a Buck converter operating in the PFM mode is less than the frequency of the Buck converter operating in the PWM mode, the preferred embodiment of the present invention adopts the comparison of frequency to achieve the function of switching between the PFM mode and the PWM mode. As the method has an inherent hysteretic effect, an additional counter is not required to perform switching of the operation mode after waiting for a certain period. The method allows the switching between the PWM mode and the PFM mode not to be limited by the time of the hysteretic effect, thus quickly reflecting the state of the output current and switching to the appropriate operation mode.

In order to make the aforementioned and other objects, features and advantages of the present invention comprehensible, preferred embodiments accompanied with figures are described in detail below.

DESCRIPTION OF EMBODIMENTS

Figure 1:
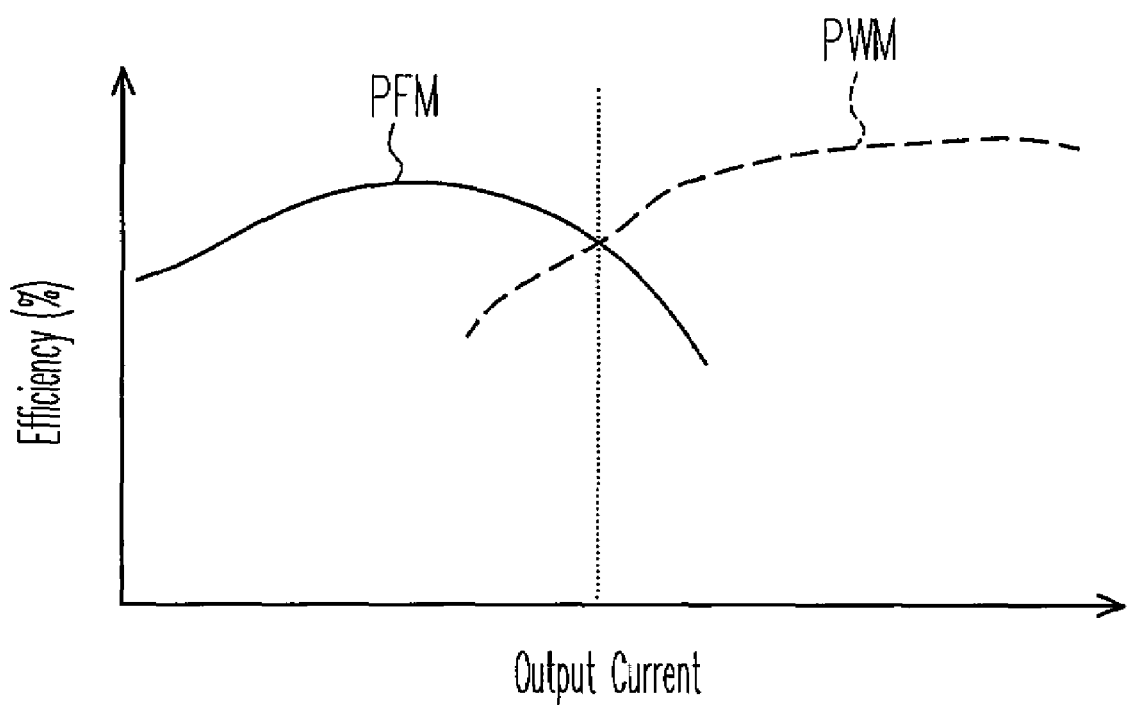
FIG. 1 illustrates the relationship between the conversion efficiency and the load current in the PWM mode and the PFM mode.
Figure 2A:
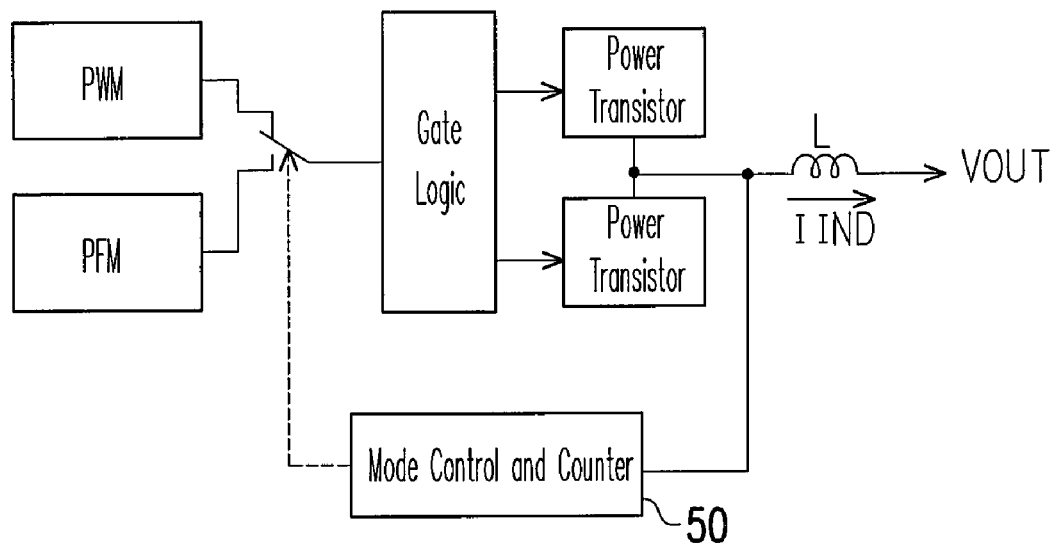
FIG. 2A is a block diagram of a circuit of a power supply apparatus disclosed in U.S. Pat. No. 6,433,525.
Figure 2B:
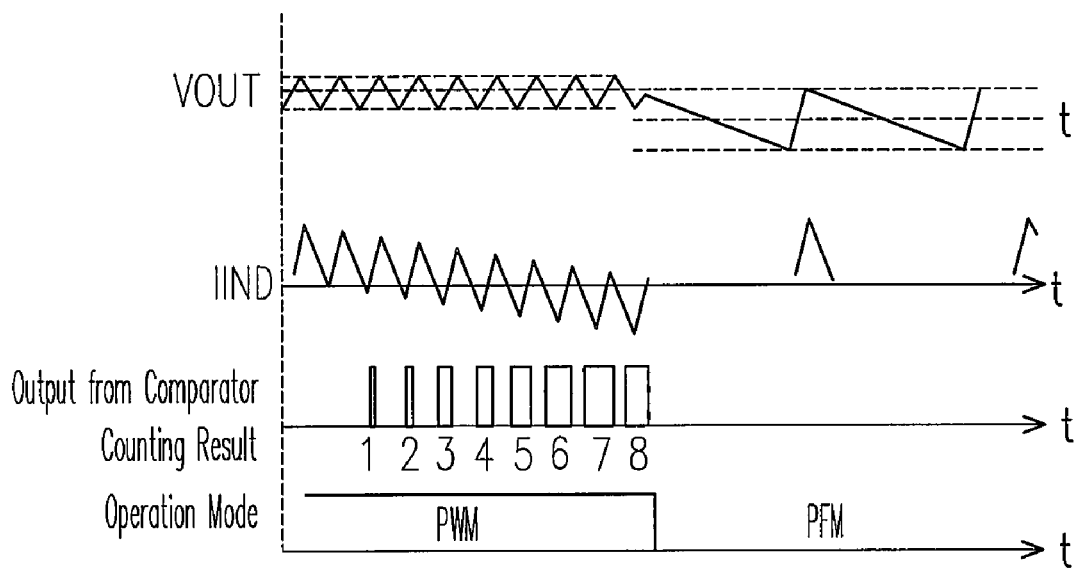
FIG. 2B is a schematic view of waveforms of signals of FIG. 2A.
Figure 3:
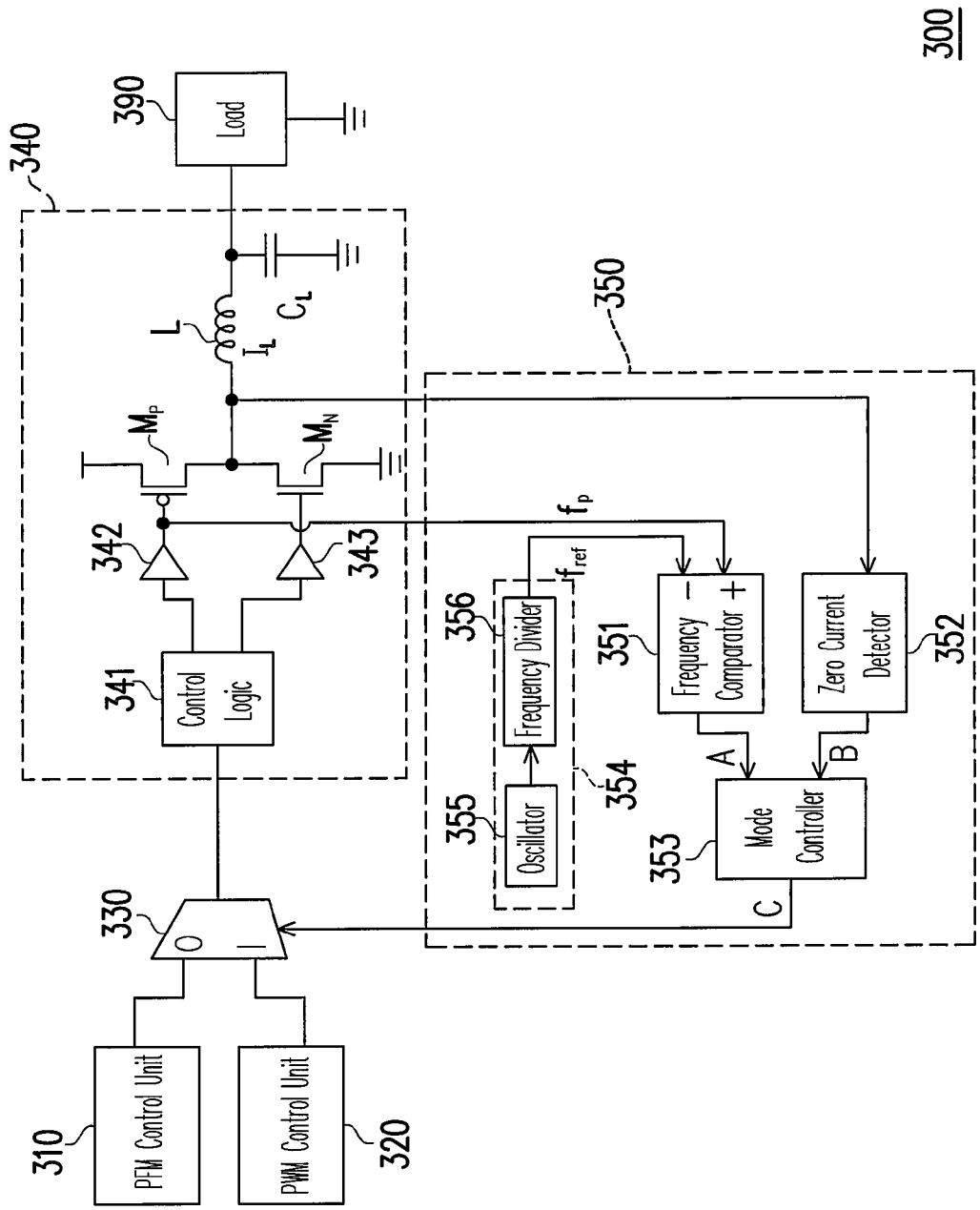
FIG. 3 is a block diagram of the circuit of a power supply apparatus according to an embodiment of the present invention.

FIG. 3 is a block diagram of the circuit of a power supply apparatus according to an embodiment of the present invention. The power supply apparatus 300 includes a first control unit 310, a second control unit 320, a switching unit 330, a power output unit 340, and an operation-mode determining unit 350. The first control unit 310 is used to provide a first control signal, and the second control unit 320 is used to provide a second control signal. In the present embodiment, the first control unit 310 is a pulse-frequency modulation (PFM) control unit, and the second control unit 320 is a pulse-width modulation (PWM) control unit. The switching unit 330 is coupled to the PFM control unit 310 and the PWM control unit 320. The switching unit 330 selects a PFM control signal output from the PFM control unit 310 or a PWM control signal output from the PWM control unit 320 according to a switching signal C, and outputs the selected control signal to the power output unit 340. The switching unit 330 can be a multiplexer.

The power output unit 340 is coupled to the switching unit 330 and a load 390. The power output unit 340 adjusts its output power in accordance with the control signal output from the switching unit 330 to provide a stable power to the load 390. For the convenience of illustration, the power supply apparatus 340 having a Buck converter is taken as an exemplary embodiment of the present invention.

The operation-mode determining unit 350 includes a frequency comparator 351, a zero current detector (ZCD) 352, and a mode controller 353. The frequency comparator 351 is coupled to the power output unit 340 to compare an operation frequency $f_p$ in the power output unit 340 with a reference frequency $f_{ref}$. The present embodiment takes the frequency of a control terminal of a first switch $M_p$ as the operation frequency $f_p$; however, it is apparent that the present invention is not limited to this. Those of ordinary skill in the art can use the frequency of other signals in the power output unit 340 serving as the operation frequency $f_p$ as required, and the frequency includes, for example, the frequency of a control terminal of a second switch $M_N$, the frequency of a second terminal of the first switch $M_p$, and so on. Moreover, in the present embodiment, the value of the reference frequency $f_{ref}$ is assumed to be less than the operation frequency in the PWM mode.

The zero current detector 352 is coupled to the power output unit 340 to detect the inductor current $I_L$ in the power output unit 340. The mode controller 353 is coupled to the frequency comparator 351, the zero current detector 352, and the switching unit 330. The mode controller 353 determines the state of the switching signal C and outputs the switching signal C to the switching unit 330 according to the comparison result A of the frequency comparator 351 and the detection result B of the zero current detector 352.

The power output unit 340 can be a Buck converter. In the present embodiment, the power output unit 340 includes a control logic 341, a first driver 342, a second driver 343, the first switch $M_p$, the second switch $M_N$, an inductor L, and a capacitor $C_L$. Here, the first switch $M_p$ is a P-type power transistor, and the second switch $M_N$ is an N-type power transistor. A first terminal of the switch $M_p$ is coupled to a voltage source. A first terminal of the switch $M_N$ is coupled to a second terminal of the switch $M_p$, and a second terminal of the switch $M_N$ is connected to ground.

The first driver 342 is coupled to a control terminal of the switch $M_p$. The second driver 343 is coupled to a control terminal of the switch $M_N$. The control logic 341 is coupled to the switching unit 330, the first driver 342, and the second driver 343, so as to control the ON/OFF state of the switches $M_p$ and $M_N$ with the drivers 342 and 343 respectively according to the control signal output from the switching unit 330. A first terminal of the inductor L is coupled to the second terminal of the switch $M_p$, and a second terminal of the inductor L provides the output power to the load 390. A first terminal of the capacitor $C_L$ is coupled to the second terminal of the inductor L, and a second terminal of the capacitor $C_L$ is connected to ground.

In the present embodiment, the operation-mode determining unit 350 further includes a clock generator 354. The clock generator 354 is used to provide the reference frequency $f_{ref}$ to the frequency comparator 351. The clock generator 354 can include an oscillator 355 and a frequency divider 356. The frequency divider 356 is coupled to the oscillator 355 to receive the output of the oscillator 355 and change its frequency, and to take the changed frequency as the reference frequency $f_{ref}$ and provide it to the frequency comparator 351.

Referring to FIG. 3, when the power supply apparatus 300 operates in the PFM operation mode, the switching unit 330 under control of the mode controller 353 selects the PFM control signal and outputs it to the control logic 341. When the power supply apparatus 300 operates in the PWM operation mode, the switching unit 330 selects the PWM control signal and outputs it to the control logic 341 according to the switching signal C.

When the frequency signal C indicates the PFM operation mode, the mode controller 353 determines whether or not to change the state of the switching signal C according to the comparison result A of the frequency comparator 351. When the frequency signal C indicates the PWM operation mode, the mode controller 353 determines whether or not to change the state of the switching signal C according to the detection result B of the zero current detector 352.

Figure 4:
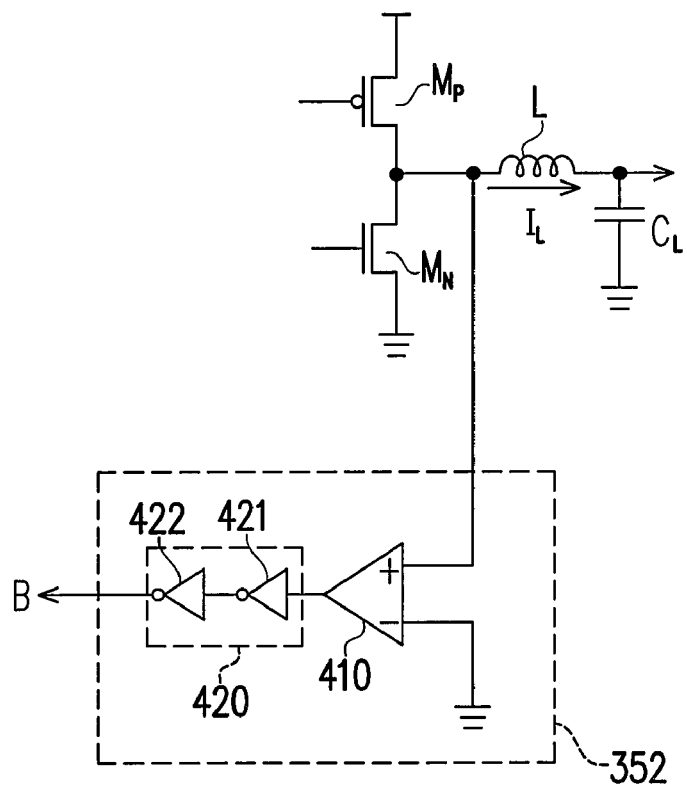
FIG. 4 is an exemplary embodiment of the zero current detector of FIG. 3 according to an embodiment of the present invention.

The implementation of the zero current detector 352 of the present embodiment is not limited herein. Those of ordinary skill in the art can select any technology to implement the zero current detector 352 as required. FIG. 4 is an exemplary embodiment of the zero current detector 352 of FIG. 3. Referring to FIG. 4, the zero current detector 352 includes a comparator 410 and a buffer 420.

Referring to FIG. 4, the positive input terminal of the comparator 410 is coupled to the first terminal of the inductor L, and the negative input terminal of the comparator 410 is connected to ground. An input terminal of the buffer 420 is coupled to an output terminal of the comparator 410, and an output terminal of the buffer 420 is coupled to the mode controller 353. In the present embodiment, the buffer 420 includes a first NOT gate 421 and a second NOT gate 422. An input terminal of the NOT gate 421 is coupled to an output terminal of the comparator 410. An input terminal of the NOT gate 422 is coupled to an output terminal of the NOT gate 421, and an output terminal of the NOT gate 422 outputs the detection result B to the mode controller 353. If the inductor current $I_L$ is positive, it is indicated that the voltage of the first terminal of the inductor L is a negative value. At this time, the comparator 410 outputs the detection result B with a logic value 0 through the buffer 420. On the contrary, if the inductor current $I_L$ is a negative value or zero, it is indicated that the voltage of the first terminal of the inductor L is a positive value or zero. At this time, the comparator 410 outputs the detection result B with a logic value 1 through the buffer 420.

Figure 5:
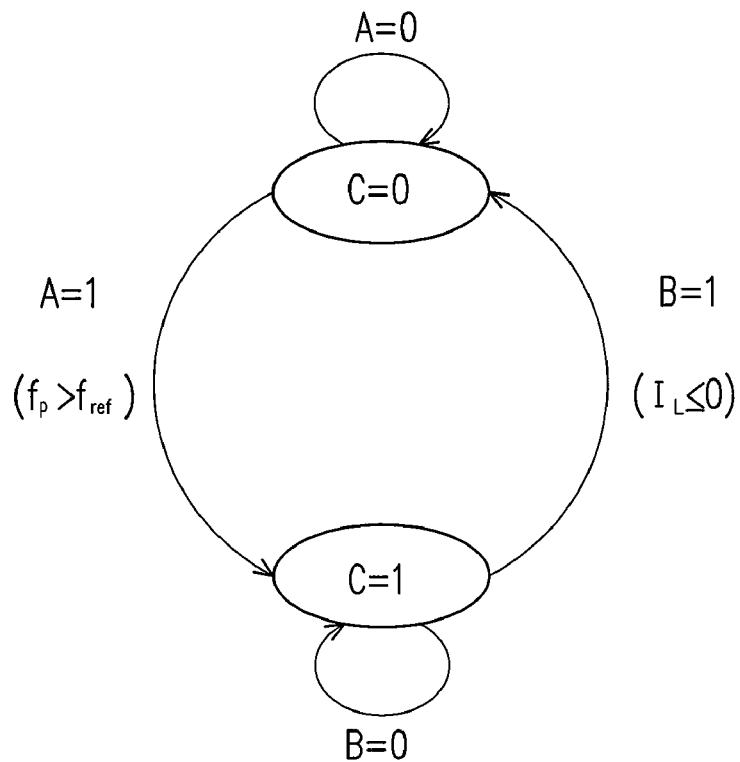
FIG. 5 is a state diagram of the mode controller of FIG. 3 according to an embodiment of the present invention.

FIG. 5 is a state diagram of the mode controller 353 of FIG. 3 according to an embodiment of the present invention. Referring to FIGS. 3 and 5 together, it is assumed that the power supply apparatus 300 operates in the PWM mode from the very beginning (here the logic value of the switching signal C is assumed to be 1), and the inductor current $I_L$ is positive (so that the logic value of the detection result B is 0), and the power supply apparatus 300 maintains in the PWM operation mode. In the PWM mode, the mode controller 353 can ignore the logic state of the comparison result A. When the load is reduced, which leads to turning the inductor current $I_L$, the zero current detector 352 will detect this situation, and outputs the detection result B with a logic value 1 to inform the mode controller 353. As the detection result B transits to 1, the switching signal C output from the mode controller 35 transits to 0. Therefore, the operation mode of the power supply apparatus 300 is converted from the PWM mode to the PFM mode.

In the PFM mode, the mode controller 353 can ignore the logic state of the detection result B. As the operation frequency in the PFM mode is far less than the reference frequency $f_{ref}$, the logic value of the comparison result A of the frequency comparator 351 is 0. As the logic value of the comparison result is still 0, the switching signal C output from the mode controller 353 maintains logic 0. Therefore, the power supply apparatus 300 is maintained in the PFM operation mode. In the PFM operation mode, when the load current (the inductor current $I_L$) increases, the switching frequency of the power supply apparatus 300 (e.g., the operation frequency $f_p$ in FIG. 3) increases accordingly. When the operation frequency $f_p$ is larger than the predetermined reference frequency $f_{ref}$, the frequency comparator 351 outputs a logic signal (the comparison result A) with a logic value 1. As the comparison result A transits to 1, the switching signal C output from the mode controller 353 transits to 1. Therefore, the operation mode of the power supply apparatus 300 is converted from the PFM mode to the PWM mode.

The method of determining the operation mode of the power supply apparatus is illustrated with reference to another embodiment of the present invention. First, the operation frequency in the power supply apparatus is compared with the reference frequency, and the inductor current in the power supply apparatus is detected. When the power supply apparatus operates in the first operation mode (e.g., the PFM operation mode), whether or not to change the operation mode of the power supply apparatus is determined according to the comparison result. When the power supply apparatus operates in a second operation mode (e.g., the PWM operation mode), whether or not to change the operation mode of the power supply apparatus is determined according to the detection result.

In the first operation mode, when the comparison result indicates that the operation frequency is larger than the reference frequency, the operation mode of the power supply apparatus is changed to be the second operation mode. When the comparison result indicates that the operation frequency is less than the reference frequency, the operation mode of the power supply apparatus is maintained in the first operation mode.

In the second operation mode, when the detection result indicates that the inductor current is larger than zero, the operation mode of the power supply apparatus is maintained in the second operation mode. When the detection result indicates that the inductor current is less than or equal to zero, the operation mode of the power supply apparatus is changed to the first operation mode.

In the present embodiment, the step of detecting the inductor current includes comparing the ground voltage and the voltage of the inductor in the power supply apparatus, and taking the comparison result of the two voltages as the detection result.

To sum up, by utilizing the characteristic that the frequency of a Buck converter operating in the PFM mode is less than the frequency of the Buck converter operating in the PWM mode, the preferred embodiment of the present invention adopts the comparison of frequency to achieve the function of switching between the PFM mode and the PWM mode. As the method has an inherent hysteretic effect, an additional counter is not required to perform switching of the operation mode after waiting for a certain period. The method allows the switching between the PWM mode and the PFM mode not to be limited by the time of the hysteretic effect, thus quickly reflecting the state of the output current and switching to the appropriate operation mode.

It will be apparent to persons of ordinary art in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power supply apparatus, comprising:
   a first control unit, providing a pulse-frequency modulation (PFM) control signal;

a second control unit, providing a pulse-width modulation (PWM) control signal;

a switching unit, coupled to the first control unit and the second control unit for selecting one of the PFM control signal and the PWM control signal according to a switching signal and outputting the selected control signal;

a power output unit, coupled to the switching unit, wherein the power output unit adjusts an output power thereof in accordance with the selected control signal outputted from the switching unit; and an operation-mode determining unit, coupled to the power output unit and the switching unit for detecting an inductor current and an operation frequency in the power output unit for determining a state of the switching signal and outputting the switching signal to the switching unit according to the detection result.

2. The power supply apparatus as claimed in claim 1, wherein the operation-mode determining unit comprises:

a frequency comparator, coupled to the power output unit to compare an operation frequency in the power output unit with a reference frequency;

a zero current detector, coupled to the power output unit to detect an inductor current in the power output unit; and a mode controller, coupled to the frequency comparator, the zero current detector, and the switching unit to determine a state of the switching signal and output it to the switching unit according to the comparison result of the frequency comparator and the detection result of the zero current detector.

3. The power supply apparatus as claimed in claim 1, wherein the first control unit comprises a PFM control unit.

4. The power supply apparatus as claimed in claim 1, wherein the second control unit comprises a PWM control unit.

5. The power supply apparatus as claimed in claim 1, wherein the switching unit comprises a multiplexer.

6. The power supply apparatus as claimed in claim 1, wherein the power output unit comprises a Buck converter.

7. The power supply apparatus as claimed in claim 1, wherein the power output unit comprises:

a first switch, with a first terminal coupled to a voltage source;

a second switch, with a first terminal coupled to a second terminal of the first switch and a second terminal connected to ground;

a first driver, coupled to a control terminal of the first switch;

a second driver, coupled to a control terminal of the second switch;

a control logic, coupled to the switching unit, the first driver, and the second driver to control an ON/OFF state of the first switch and the second switch through the first driver and the second driver respectively in accordance with the control signal output from the switching unit;

an inductor, comprising a first terminal coupled to the second terminal of the first switch and a second terminal providing the output power; and a capacitor, comprising a first terminal coupled to the second terminal of the inductor and a second terminal connected to ground.

8. The power supply apparatus as claimed in claim 7, wherein the first switch comprises a P-type power transistor, and the second switch comprises an N-type power transistor.

9. The power supply apparatus as claimed in claim 7, wherein the frequency comparator couples to the control terminal of the first switch for comparing the operation frequency of control terminal of the first switch with the reference frequency.

10. The power supply apparatus as claimed in claim 1, wherein the operation-mode determining unit further comprises:

a clock generator, coupled to the frequency comparator to provide the reference frequency.

11. The power supply apparatus as claimed in claim 10, wherein the clock generator comprises:

an oscillator; and a frequency divider, coupled to the oscillator to receive the output of the oscillator and changing its frequency and take the changed frequency as the reference frequency.

12. The power supply apparatus as claimed in claim 1, wherein the zero current detector comprises:

a comparator, comprising a positive input terminal coupled to the first terminal of the inductor and a negative input terminal connected to ground; and a buffer, comprising an input terminal coupled to an output terminal of the comparator and an output terminal coupled to the mode controller.

13. The power supply apparatus as claimed in claim 12, wherein the buffer comprises:

a first NOT gate, comprising an input terminal coupled to the output terminal of the comparator; and a second NOT gate, comprising an input terminal coupled to an output terminal of the first NOT gate and an output terminal coupled to the mode controller.

14. The power supply apparatus as claimed in claim 1, wherein:

the switching unit selects and outputs the first control signal when the power supply apparatus operates in a first operation mode;

the switching unit selects and outputs the second control signal when the power supply apparatus operates in a second operation mode;

the mode controller determines whether or not to change an output state of the mode controller according to the comparison result of the frequency comparator when an output of the mode controller indicates the first operation mode; and the mode controller determines whether or not to change the output state of the mode controller according to the detection result of the zero current comparator when the output of the mode controller indicates the second operation mode.

15. The power supply apparatus as claimed in claim 14, wherein the first operation mode comprises the PFM mode.

16. The power supply apparatus as claimed in claim 14, wherein the second operation mode comprises the PWM mode.

17. An operation-mode determining unit, for switching an operation mode of a power supply apparatus, comprising:

a frequency comparator, for comparing a reference frequency and an operation frequency in the power supply apparatus;

a zero current detector, for detecting an inductor current in the power supply apparatus; and a mode controller, coupled to the frequency comparator and the zero current detector for determining a state of a switching signal and outputting the switching signal to the power supply apparatus according to the comparison result of the frequency comparator and the detection result of the zero current detector;

wherein the power supply apparatus determines the operation mode according to the switching signal.

18. The operation-mode determining unit as claimed in claim 17, further comprising:
a clock generator, coupled to the frequency comparator to provide the reference frequency.

19. The operation-mode determining unit as claimed in claim 18, wherein the clock generator comprises:
an oscillator; and
a frequency divider, coupled to the oscillator to receive the output of the oscillator and changing its frequency and take the changed frequency as the reference frequency.

20. The operation-mode determining unit as claimed in claim 17, wherein the zero current detector comprises:
a comparator, comprising a positive input terminal coupled to the first terminal of a inductor in the power supply apparatus, and a negative input terminal connected to ground; and
a buffer, comprising an input terminal coupled to an output terminal of the comparator and an output terminal coupled to the mode controller.

21. The operation-mode determining unit as claimed in claim 20, wherein the buffer comprises:
a first NOT gate, comprising an input terminal coupled to the output terminal of the comparator; and
a second NOT gate, comprising an input terminal coupled to an output terminal of the first NOT gate and an output terminal coupled to the mode controller.

22. The operation-mode determining unit as claimed in claim 17, wherein:
the mode controller determines whether or not to change an output state of the mode controller according to the comparison result of the frequency comparator when the power supply apparatus operates in a first operation mode according to an output of the mode controller; and
the mode controller determines whether or not to change the output state of the mode controller according to the detection result of the zero current detector when the power supply apparatus operates in a second operation mode according to the output of the mode controller.

23. The operation-mode determining unit as claimed in claim 22, wherein the first operation mode comprises a pulse-frequency modulation (PFM) mode.

24. The operation-mode determining unit as claimed in claim 22, wherein the second operation mode comprises a pulse-width modulation (PWM) mode.

25. A method of determining an operation mode of a power supply apparatus, comprising:
comparing an operation frequency in the power supply apparatus with a reference frequency;
detecting an inductor current in the power supply apparatus;
determining whether or not to change the operation mode of the power supply apparatus according to the comparison result when the power supply apparatus operates in a first operation mode; and
determining whether or not to change the operation mode of the power supply apparatus according to the detection result when the power supply apparatus operates in a second operation mode.

26. The method of determining the operation mode of the power supply apparatus as claimed in claim 25, wherein the first operation mode comprises the PFM mode.

27. The method of determining the operation mode of the power supply apparatus as claimed in claim 25, wherein the second operation mode comprises the PWM mode.

28. The method of determining the operation mode of the power supply apparatus as claimed in claim 25, further comprising:
changing the operation mode of the power supply apparatus to the second operation mode when the comparison result indicates that the operation frequency is larger than the reference frequency; and
maintaining the operation mode of the power supply apparatus in the first operation mode when the comparison result indicates that the operation frequency is less than the reference frequency.

29. The method of determining the operation mode of the power supply apparatus as claimed in claim 25, further comprising:
maintaining the operation mode of the power supply apparatus in the second operation mode when the detection result indicates that the inductor current is larger than zero; and
changing the operation mode of the power supply apparatus to the first operation mode when the detection result indicates that the inductor current is less than or equal to zero.

30. The method of determining the operation mode of the power supply apparatus as claimed in claim 25, wherein the step of detecting the inductor current comprises:
comparing a ground voltage with the voltage of an inductor in the power supply apparatus, and taking the comparison result of the two voltages as the detection result.

* * * * *